United States Patent
Obiya et al.

(10) Patent No.: US 9,948,331 B2
(45) Date of Patent: Apr. 17, 2018

(54) TRANSMISSION CIRCUIT, HIGH-FREQUENCY FRONT-END CIRCUIT, TRANSMISSION SIGNAL CONTROL METHOD, AND HIGH-FREQUENCY FRONT-END TRANSMISSION/RECEPTION CONTROL METHOD

(71) Applicant: MURATA MANUFACTURING CO., LTD., Kyoto (JP)

(72) Inventors: Hidenori Obiya, Kyoto (JP); Shinya Hitomi, Kyoto (JP); Kiichiro Takenaka, Kyoto (JP); Masahiro Ito, Kyoto (JP); Satoshi Arayashiki, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 15/366,355

(22) Filed: Dec. 1, 2016

(65) Prior Publication Data
US 2017/0085279 A1    Mar. 23, 2017

Related U.S. Application Data

(63) Continuation of application No. PCT/JP2015/065179, filed on May 27, 2015.

(30) Foreign Application Priority Data

Jun. 2, 2014  (JP) ................................ 2014-113667

(51) Int. Cl.
*H04B 1/04*      (2006.01)
*H04L 27/26*     (2006.01)
*H04B 1/525*     (2015.01)

(52) U.S. Cl.
CPC ............... *H04B 1/04* (2013.01); *H04B 1/525* (2013.01); *H04L 27/2691* (2013.01)

(58) Field of Classification Search
CPC ........ H04L 27/2691; H04B 1/525; H04B 1/04
See application file for complete search history.

(56) References Cited

U.S. PATENT DOCUMENTS 6,489,862 B1 * 12/2002 Frank ........................ H03F 1/26
                                                       330/302
2002/0079963 A1 * 6/2002 Kusunoki ............. H03F 1/3288
                                                       330/149

(Continued)

FOREIGN PATENT DOCUMENTS

JP      2002185262 A    6/2002
JP      2011118227 A    9/2011
(Continued)

OTHER PUBLICATIONS

International Search Report issued in Patent Application No. PCT/JP2015/065179 dated Jul. 7, 2015.

(Continued)

*Primary Examiner* — Syed Haider
(74) *Attorney, Agent, or Firm* — Pearne & Gordon LLP

(57) ABSTRACT

A transmission circuit includes a transmission signal generation unit, a control unit, and a transmission signal amplification unit. The transmission signal generation unit generates a transmission signal that has been modulated. The transmission signal amplification unit includes a power amplifier that amplifies the transmission signal. The control unit determines a supply voltage signal having an amplitude characteristic of a period identical to that of an envelope of the transmission signal and supplies the supply voltage signal to the power amplifier. The control unit determines an output timing of the supply voltage signal such that a phase (Continued)

difference between a phase of the envelope of the transmission signal and a phase of the supply voltage signal does not become zero.

9 Claims, 4 Drawing Sheets

(56) References Cited

U.S. PATENT DOCUMENTS

| | | | |
|---|---|---|---|
| 2003/0203743 A1* | 10/2003 | Sugar | H04B 1/005 455/550.1 |
| 2004/0061555 A1* | 4/2004 | Lynch | H03F 1/0222 330/136 |
| 2012/0126893 A1 | 5/2012 | Yamanouchi et al. | |
| 2013/0285748 A1* | 10/2013 | Hongo | H03F 1/0222 330/291 |

FOREIGN PATENT DOCUMENTS

| | | | | |
|---|---|---|---|---|
| WO | 2008/129611 A1 | 10/2008 | | |
| WO | WO 2008129611 A1 * | 10/2008 | | H03F 1/0216 |
| WO | 2011/013420 A1 | 2/2011 | | |

OTHER PUBLICATIONS

Written Opinion issued in Patent Application No. PCT/JP2015/065179 dated Jul. 7, 2015.

* cited by examiner

TRANSMISSION CIRCUIT, HIGH-FREQUENCY FRONT-END CIRCUIT, TRANSMISSION SIGNAL CONTROL METHOD, AND HIGH-FREQUENCY FRONT-END TRANSMISSION/RECEPTION CONTROL METHOD

This is a continuation of International Application No. PCT/JP2015/065179 filed on May 27, 2015 which claims priority from Japanese Patent Application No. 2014-113667 filed on Jun. 2, 2014. The contents of these applications are incorporated herein by reference in their entireties.

BACKGROUND

Technical Field

The present disclosure relates to a transmission circuit that amplifies and outputs a high-frequency transmission signal and to a high-frequency front-end circuit including the transmission circuit.

Various types of high-frequency front-end circuits and radio communication devices that use a multimode/multiband power amplifier capable of amplifying transmission signals of a plurality of communication bands have been proposed as described in Patent Document 1, for example. Multimode/multiband power amplifiers are devices capable of achieving a desired gain in each frequency band of a plurality of communication bands and are designed to be able to achieve a desired gain in a wide band (wide frequency band).

Such high-frequency front-end circuits and radio communication devices also include a reception-side circuit including an LNA (Low Noise Amplifier) that amplifies a reception signal and so forth.

Patent Document 1: Japanese Unexamined Patent Application Publication No. 2011-182271

Transmission-signal leakage to a reception-side circuit is an issue in such high-frequency front-end circuits. Specifically, a transmission signal output from a power amplifier included in a transmission circuit sometimes leaks to a reception-side circuit, and such transmission-signal leakage decreases the S/N ratio of a reception signal.

In particular, if a predetermined frequency band of a transmission signal and a predetermined frequency band of a reception signal in a communication band are set close to each other due to an increase in the number of communication bands, the possibility of the predetermined frequency component (reception frequency component) of the reception signal contained in the transmission signal leaking to the reception-side circuit increases.

In addition, multimode/multiband power amplifiers are capable of achieving a gain in a wide band but may cause noise in a band outside the desired frequency band due to distortion characteristics thereof. This noise may be caused at the predetermined frequency of the reception signal contained in the transmission signal and leak to the reception-side circuit, and further decrease the S/N ratio of the reception signal.

Accordingly, the present disclosure provides a transmission circuit capable of suppressing a predetermined frequency component of a reception signal contained in a transmission signal and a high-frequency front-end circuit including the transmission circuit.

Solution to Problem

A transmission circuit according to this disclosure includes a transmission signal generation unit, a transmission signal amplification unit, and a control unit. The transmission signal generation unit generates a transmission signal that has been modulated. The transmission signal amplification unit includes a power amplifier that amplifies the transmission signal. The control unit determines a supply voltage signal having an amplitude characteristic of a period identical to that of an envelope of the transmission signal and supplies the supply voltage signal to the power amplifier. The control unit determines an output timing of the supply voltage signal such that a phase difference between a phase of the envelope of the transmission signal and a phase of the supply voltage signal does not become zero.

With this configuration, the power level of a reception-signal frequency component contained in a transmission signal changes in accordance with a phase difference between a phase of an envelope of the transmission signal and a phase of a supply voltage signal. Accordingly, the power level of the reception-signal frequency component contained in the transmission signal is suppressed by setting the phase different to a predetermined value.

In addition, in the transmission circuit according to this disclosure, the transmission signal generation unit can perform distortion-compensating frequency component control during generation of the transmission signal.

With this configuration, the power level of the reception-signal frequency component contained in the transmission signal is further suppressed.

In addition, in the transmission circuit according to this disclosure, the transmission signal amplification unit can include a plurality of stages of power amplifiers. With this configuration, in addition to the aforementioned advantageous effects, a gain with which the transmission is amplified can be increased.

In addition, in the transmission circuit according to this disclosure, the control unit determines an output timing of the supply voltage signal such that a phase difference between a phase of the supply voltage signal for at least one power amplifier among the plurality of stages of power amplifiers and a phase of an envelope signal of the transmission signal does not become zero. This configuration indicates an embodiment of the transmission signal amplification unit which includes a plurality of stages of power amplifiers.

In addition, the transmission circuit according to this disclosure can be configured as follows. The transmission signal amplification unit includes a plurality of stages of power amplifiers and a filter. The filter is connected between a last-stage power amplifier and a preceding-stage power amplifier among the plurality of stages of power amplifiers. The filter has filter characteristics that a frequency of the transmission signal is within its passband and a frequency band of a reception signal corresponding to the transmission signal is outside the passband.

With this configuration, the power level of the reception-signal frequency component contained in the transmission signal is further suppressed.

In addition, in the transmission circuit according to this disclosure, the control unit determines an output timing of the supply voltage signal such that a phase difference between a phase of the supply voltage signal for the last-stage power amplifier and a phase of the envelope signal of the transmission signal does not become zero. This configuration indicates an embodiment of the transmission signal amplification unit which includes a plurality of stages of power amplifiers.

In addition, a high-frequency front-end circuit according to this disclosure includes the transmission circuit, a reception circuit that performs predetermined signal processing on a reception signal, and a wave separator. The wave separator transfers the transmission signal output from the transmission circuit to an antenna and transfers the reception signal supplied from the antenna to the reception circuit.

With this configuration, a reception-signal frequency component that is contained in a transmission signal and leaks from the transmission circuit to a reception-signal amplification circuit is suppressed, and consequently the S/N ratio of the reception signal is successfully increased.

In addition, the high-frequency front-end circuit according to this disclosure is applicable to a case where a predetermined frequency band of the reception signal and a predetermined frequency band of the transmission signal are close to each other. With this configuration, the configuration of the present disclosure works more effectively.

In addition, the wave separator of the high-frequency front-end circuit according to this disclosure can be configured as follows. The wave separator includes a circulator, a transmission-side variable filter, and a reception-side variable filter. The circulator includes a first terminal to be connected to the transmission circuit, a second terminal to be connected to the reception circuit, and a third terminal to be connected to circuit on the antenna side. The transmission-side variable filter is connected between the circulator and the transmission circuit and has filter characteristics that a predetermined frequency of the transmission signal is within its passband. The reception-side variable filter is connected between the circulator and the reception circuit and has filter characteristics that a predetermined frequency of the reception signal is within its passband.

With this configuration, the high-frequency front-end circuit capable of handling multiple bands can be made smaller. Further, leakage of the reception-signal frequency component contained in the transmission signal from the transmission circuit to the reception circuit is successfully suppressed in each communication band, and consequently the S/N ratio of the reception signal in each communication band is successfully increased.

According to this disclosure, a predetermined frequency component of a reception signal contained in a transmission signal is successfully suppressed.

DETAILED DESCRIPTION

Figure 1:
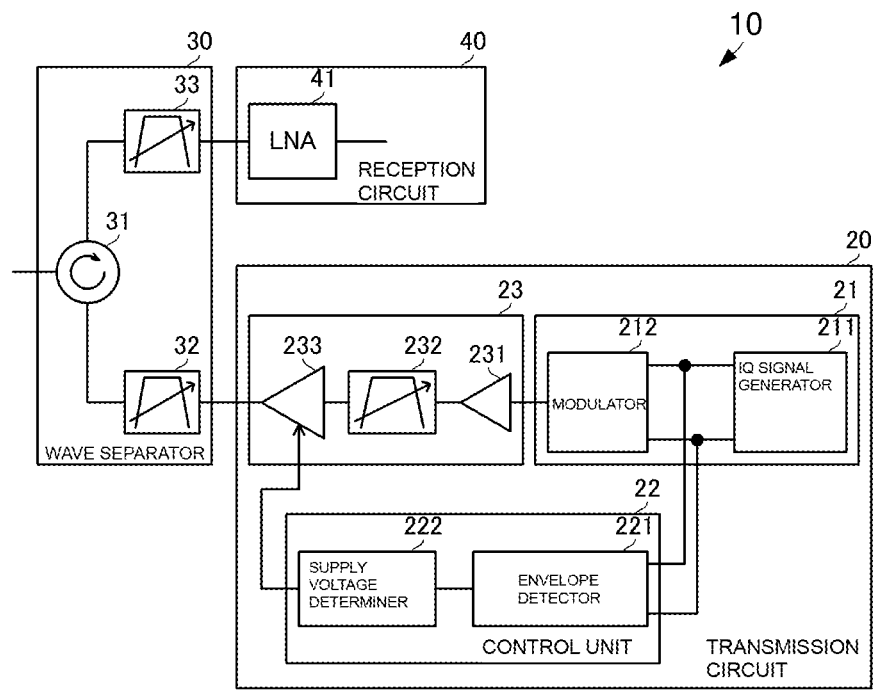
FIG. 1 is a circuit block diagram of a high-frequency front-end circuit including a transmission circuit according to a first embodiment of the present disclosure.

A transmission circuit and a high-frequency front-end circuit according to a first embodiment of the present disclosure will be described with reference to the drawings. FIG. 1 is a circuit block diagram of a high-frequency front-end circuit including a transmission circuit according to the first embodiment of the present disclosure.

A high-frequency front-end circuit 10 includes a transmission circuit 20, a wave separator 30, and a reception circuit 40. The reception circuit 40 corresponds to a "reception signal amplification unit" of the present disclosure.

The transmission circuit 20 includes a transmission signal generation unit or circuit 21, a control unit or circuit 22, and a transmission signal amplification unit or circuit 23. The transmission circuit 20 is a multiband transmission circuit capable of generating and amplifying transmission signals of a plurality of communication bands. A specific configuration and signal processing of each functional block of the transmission circuit 20 will be described later.

In general, the transmission signal generation unit 21 generates a transmission signal that has been amplitude-modulated for each communication band from a baseband signal input thereto from a baseband processing unit not illustrated. The control unit 22 determines a supply voltage signal to be fed to a power amplifier 233 of the transmission signal amplification unit 23 and controls supply voltage of the power amplifier 233. The transmission signal amplification unit 23 includes a power supply for the power amplifier, and the power supply operates in accordance with the supply voltage signal fed from the control unit 22 and applies a voltage to the power amplifier 233. The power amplifier 233 amplifies the transmission signal in accordance with this voltage and outputs the resultant signal.

The wave separator 30 includes a circulator 31, a transmission-side variable filter 32, and a reception-side variable filter 33. The wave separator 30 is a multiband wave separator capable of separating a transmission signal and a reception signal from each other in a plurality of communication bands.

The circulator 31 includes a first terminal to be connected to an antenna, a second terminal to be connected to the transmission circuit 20, and a third terminal to be connected to the reception circuit 40 including an LNA 41. The circulator 31 transfers, to the first terminal, a high-frequency signal input thereto from the second terminal and transfers, to the third terminal, a high-frequency signal input thereto from the first terminal.

The transmission-side variable filter 32 is a filter whose passband frequency is adjustable. The transmission-side variable filter 32 has filter characteristics that, for each communication band, a frequency band of the transmission signal is within the passband and at least frequency band of the reception signal is outside the passband.

The reception-side variable filter 33 is a filter whose passband frequency is adjustable. The reception-side variable filter 33 has filter characteristics that, for each communication band, a frequency band of the reception signal is within the passband and at least frequency band of the transmission signal is outside the passband.

Both the transmission-side variable filters 32 and the reception-side variable filter 33 are illustrated as bandpass filters in FIG. 1; however, the transmission-side variable filters and the reception-side variable filter may be implemented by a combination of two or more filters selected from among a low-pass filter, a high-pass filter, and a band elimination filter, for example.

By configuring the wave separator 30 to include the circulator 31, the transmission-side variable filter 32, and the reception-side variable filter 33, a small and simple wave separator having a variable passband can be implemented.

The second terminal of the circulator 31 is connected to a transmission-signal output terminal of the transmission circuit 20 with the transmission-side variable filter 32 interposed therebetween. The third terminal of the circulator 31 is connected to a reception-signal input terminal of the reception circuit 40 with the reception-side variable filter 33 interposed therebetween. With this configuration, a transmission signal output from the transmission circuit 20 is transferred to the antenna via the wave separator 30. A reception signal from the antenna is input to the reception circuit 40 via the wave separator 30.

A specific configuration and processing of the transmission circuit 20 will be described next.

The transmission signal generation unit 21 of the transmission circuit 20 includes an IQ signal generator 211 and a modulator 212. The IQ signal generator 211 generates an I-phase signal and a Q-phase signal from a baseband signal input thereto from the baseband processing unit not illustrated. The modulator 212 performs an IQ modulation process by combining the I-phase signal and the Q-phase signal and outputs a transmission signal. At that time, the transmission signal is generated as a modulated signal obtained by performing amplitude modulation on a carrier signal having a predetermined frequency at a period longer than that of the carrier signal. The transmission signal generation unit 21 outputs the transmission signal to the control unit 22.

The control unit 22 of the transmission circuit 20 includes an envelope detector 221 and a supply voltage determiner 222. The envelope detector 221 detects an envelope of the signals output from the IQ signal generator 211. That is, the envelope detector 221 detects an amplitude modulation waveform (envelope signal) of the carrier signal that forms the transmission signal. Specifically, the envelope detector 211 detects an envelope signal from the I-phase signal and the Q-phase signal. The envelope detector 221 outputs the envelope signal to the supply voltage determiner 222.

The supply voltage determiner 222 determines a supply voltage signal by using the waveform of the envelope signal and the set gain. The period of the supply voltage signal is the same as that of the envelope signal. The amplitude fluctuation of the supply voltage signal is the same as that of the envelope signal. That is, the envelope signal and the supply voltage signal have the same amplitude characteristics (period and amplitude fluctuation). The supply voltage determiner 222 applies the supply voltage signal to the power amplifier 233 at a timing described later.

A configuration in which the envelope detector 221 and the supply voltage determiner 222 are implemented as separate functional blocks has been described in this embodiment; however, the envelope detector 221 and the supply voltage determiner 222 may be implemented as one IC in a practical circuit configuration. In such a case, an IC that implements the control unit 22 stores, for each envelope, a supply voltage signal and determines, upon detection of an envelope, a supply voltage signal and an application timing corresponding to this envelope.

The transmission signal amplification unit 23 of the transmission circuit 20 includes two stages of power amplifiers 231 and 233 and a variable filter 232. The variable filter 232 is connected between the first-stage power amplifier 231 and the last-stage power amplifier 233. The variable filter 232 is capable of adjusting the passband in accordance with the transmission signal of each communication band generated by the transmission circuit 20. A supply voltage corresponding to the supply voltage signal is applied to last-stage power amplifier 233 by the control unit 222, and the last-stage power amplifier 233 amplifies the transmission signal in accordance with the amplitude of the supply voltage.

As described above, the transmission circuit 20 according to this embodiment performs an amplification process in which an envelope tracking process is performed on the transmission signal. Further, the transmission circuit 20 according to this embodiment applies the supply voltage at a timing described below.

Figure 2:
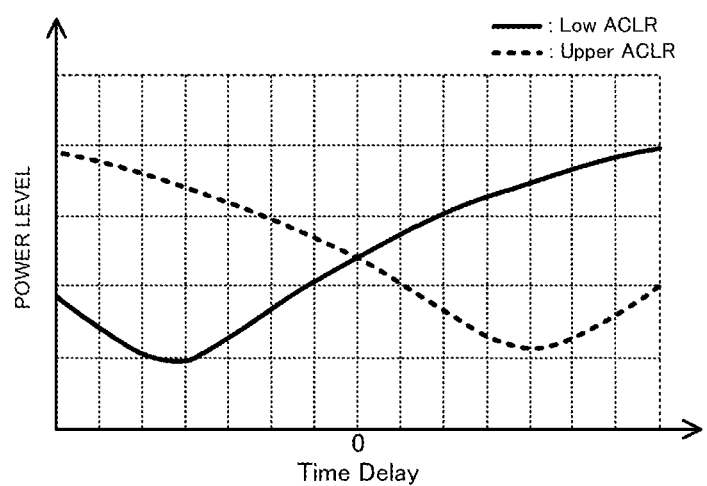
FIG. 2 is a diagram illustrating ACLR characteristics of the transmission circuit according to the first embodiment of the present disclosure.

FIG. 2 is a diagram illustrating ACLR characteristics of the transmission circuit according to the first embodiment of the present disclosure. A solid line in FIG. 2 indicates ACLR (Adjacent Channel Leakage Ratio) on a lower frequency side, whereas a dash line in FIG. 2 indicates ACLR on a higher frequency side. The horizontal axis of FIG. 2 denotes the time difference (phase difference) between the transmission signal and the supply voltage signal, whereas the vertical axis of FIG. 2 denotes the power level. A time difference of zero indicates that the timing at which the transmission signal is input to the transmission signal amplification unit 23 from the transmission signal generation unit 21 matches the timing at which the supply voltage signal is applied to the transmission signal amplification unit 23. For example, it indicates that the timing at which the amplitude of the positive-value-side envelope of the transmission signal input to the transmission signal amplification unit 23 becomes the smallest matches the timing at which the amplitude for the positive value of the supply voltage applied to the transmission signal amplification unit 23 becomes the smallest.

As illustrated in FIG. 2, the ACLR on the higher frequency side matches the ACLR on the lower frequency side when the time difference is zero. However, when the time difference is not zero, the ACLR on the higher frequency side is higher or lower than the ACLR on the lower frequency side. In addition, for the ACLR on the lower frequency side, the power level at the time difference of less than zero is lower than the power level at the time difference of zero or greater. For the ACLR on the higher frequency side, the power level at the time difference of more than zero is lower than the power level at the time difference of zero or less.

Accordingly, the ACLR level on the higher frequency side of the transmission signal or the ACLR level on the lower frequency side of the transmission signal can be controlled by using the time difference (phase difference) between the transmission signal and the supply voltage signal.

The supply voltage determiner 222 of the control unit 22 stores, for each communication band, a time difference (phase difference) between the transmission signal and the supply voltage signal. The supply voltage determiner 222 receives information concerning a communication band from the baseband processing unit not illustrated, determines a time difference between the transmission signal and the supply voltage signal in accordance with the information, and applies the supply voltage signal to the power amplifier 233 at a timing corresponding to this time difference. At that time, the time difference is set to a non-zero value.

Specifically, if the frequency of the reception signal is higher than the frequency of the transmission signal, the supply voltage determiner 222 sets the time difference to a predetermined value that is larger than zero. If the frequency of the reception signal is lower than the frequency of the transmission signal, the supply voltage determiner 222 sets the time difference to a predetermined value that is smaller than or equal to zero.

With such a configuration, the reception-signal frequency component contained in the transmission signal output from the transmission signal amplification unit 23 is successfully suppressed.

Figure 3A:
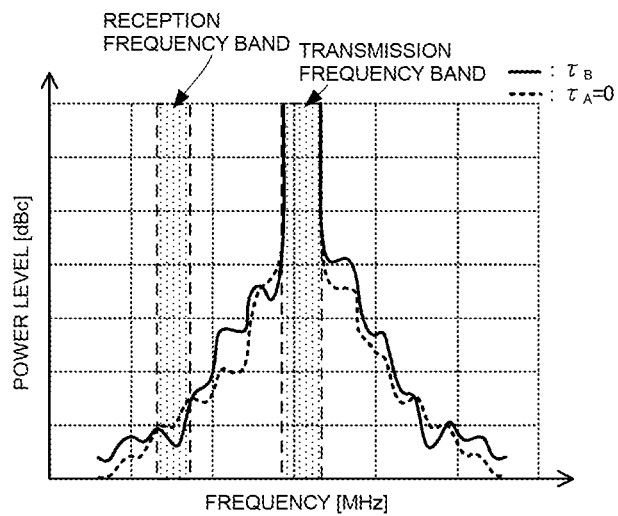
FIGS. 3A and 3B are diagrams illustrating frequency characteristics of power levels of transmission signals of the transmission circuit according to the first embodiment of the present disclosure and a transmission circuit of the related art.
Figure 3B:
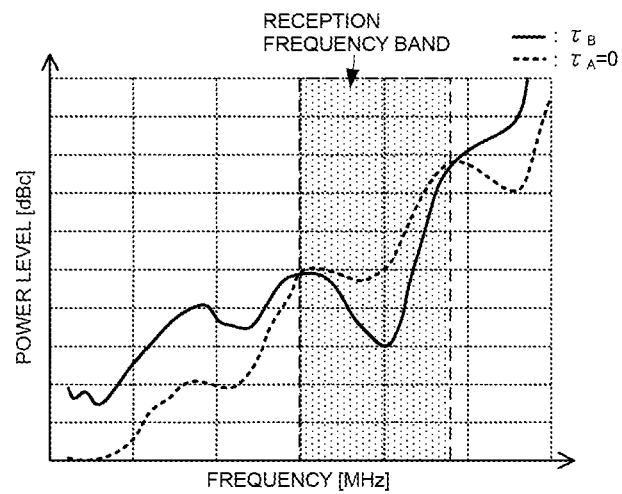

FIGS. 3A and 3B are diagrams illustrating frequency characteristics of power levels of transmission signals of the transmission circuit according to the first embodiment of the present disclosure and a transmission circuit of the related art. In FIGS. 3A and 3B, a solid line denotes the case where the time difference $\tau_B \neq 0$, whereas a dash line denotes the case where the time difference $\tau_A \neq 0$. Note that the time difference used herein is a theoretical value, and the time difference of zero indicates the case where the phase difference between the transmission signal and the supply voltage signal is zero. The phase difference is possibly not zero due to a factor such as a delay caused on a transmission line in an actual circuit; however, the influence of such a difference due to a transmission delay in the circuit is successfully removed by performing adjustment in advance. The description will be given of a theoretical circumstance below.

As illustrated in part FIG. 3A, substantially the same power level of the fundamental frequency component of the transmission signal as that for the time difference $\tau_A \neq 0$ can be obtained for the time difference $\tau_B \neq 0$.

FIG. 3B is an enlarged view of a reception frequency band illustrated in FIG. 3A. As illustrated in FIG. 3B, the power level of the reception-signal frequency component contained in the transmission signal becomes lower than the power level for the time difference $\tau_A \neq 0$ by setting the time difference to $\tau_B \neq 0$.

With the configuration according to this embodiment and by performing the supply voltage application process according to this embodiment as described above, the reception-signal frequency component contained in the transmission signal is successfully suppressed.

If a predetermined frequency band of the transmission signal and a predetermined frequency band of the reception signal in a communication band are close to each other, the predetermined frequency band component of the reception signal contained in the transmission signal is more likely to be amplified by the transmission signal amplification unit 23. Accordingly, the use of the configuration of this embodiment is particularly effective.

The case where a predetermined frequency band of the transmission signal and a predetermined frequency band of the reception signal are close to each other indicates the case where the predetermined frequency band of the transmission signal and the predetermined frequency band of the reception signal is apart from each other only by a frequency spacing of approximately 20 MHz. Specifically, the case corresponds to the communication bands (frequency bands) Band 12, Band 13, Band 17, and Band 20 defined by LTE (Long Term Evolution) and W-CDMA (Wideband-Code Division Multiple Access).

FIGS. 3A and 3B illustrate the case where the frequency of the reception signal is higher than the frequency of the transmission signal; however, even in the case where the frequency of the reception signal is lower than the frequency of the transmission signal, the reception-signal frequency component contained in the transmission signal is successfully suppressed similarly if the time difference is determined on the basis of this relationship.

In this embodiment, the example of using a combination circuit of the circulator 31 and the variable filters 32 and 33 as the wave separator 30 has been described; however, a wave separator having another configuration, for example, a wave separator including a duplexer using an inductor, a capacitor, or a SAW filter may be used. However, the use of the combination circuit of the circulator 31 and the variable filters 32 and 33 allows the high-frequency front-end circuit 10 that transmits/receives on a plurality of communication bands to be smaller.

Although the wave separator 30 constituted by the combination circuit of the circulator 31 and the variable filters 32 and 33 is a small and simple component, the possibility of frequency components outside the frequency band of the transmission signal leaking to the reception circuit 40 slightly increases. However, since the reception-signal frequency component contained in the transmission signal input to the wave separator 30 is suppressed by using the transmission circuit of this embodiment, leakage to the reception circuit 40 is successfully suppressed. Consequently, the S/N ratio of the reception signal can be increased.

In addition, the transmission signal amplification unit 23 of the transmission circuit 20 according to this embodiment includes the two stages of power amplifiers 231 and 233; however, the transmission signal amplification unit 23 may include power amplifiers of the other stages, for example, one stage or three or more stages. When the transmission signal amplification unit 23 includes one stage of power amplifier, the supply voltage signal is applied to the power amplifier from the supply voltage determiner 22. When the transmission signal amplification unit 23 includes three or more stages of power amplifiers, the supply voltage signal is applied to the last-stage power amplifier from the supply voltage determiner 222.

The transmission signal amplification unit 23 of the transmission circuit 20 according to this embodiment also includes the variable filter 232 between the two stages of power amplifiers 231 and 233. The variable filter 232 can be omitted. However, by including the variable filter 232, the reception-signal frequency component contained in the transmission signal that is output from the first-stage power amplifier 231 and is input to the last-stage power amplifier 233 is successfully suppressed. With this configuration, leakage of the reception-signal frequency component contained in the transmission signal can be successfully suppressed.

Figure 4:
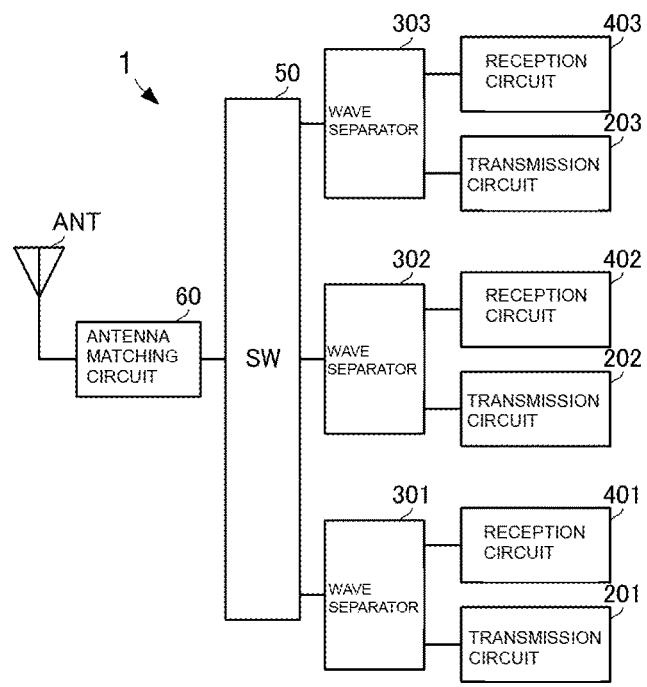
FIG. 4 is a circuit block diagram illustrating a front-end portion of a high-frequency transmission/reception device including the high-frequency front-end circuit according to the first embodiment of the present disclosure.

The transmission circuit and the high-frequency front-end circuit having such a configuration are applicable to a high-frequency transmission/reception device described next. FIG. 4 is a circuit block diagram illustrating a front-end portion of a high-frequency transmission/reception device including the high-frequency front-end circuit according to the first embodiment of the present disclosure.

A high-frequency transmission/reception device 1 includes transmission circuits 201, 202, and 203; wave separators 301, 302, and 303; reception circuits 401, 402, and 403; a switch circuit 50; an antenna matching circuit 60; and an antenna ANT. The transmission circuits 201, 202, and 203 have the above-described configuration of the transmission circuit 20. The wave separators 301, 302, and 303 have the above-described configuration of the wave separator 30.

The switch circuit 50 is connected to the antenna matching circuit 60 and the wave separators 301, 302, and 303.

The switch circuit 50 selects one of the wave separators 301, 302, and 303 in accordance with a control signal and connects the selected one to the antenna matching circuit 60.

The wave separator 301 is connected to the switch circuit 50 and to the transmission circuit 201 and the reception circuit 401. The wave separator 302 is connected to the switch circuit 50 and to the transmission circuit 202 and the reception circuit 402. The wave separator 303 is connected to the switch circuit 50 and to the transmission circuit 203 and the reception circuit 403.

The antenna ANT is connected to the switch circuit 50 with the antenna matching circuit 60 interposed therebetween.

With such a configuration, a small high-frequency transmission/reception device that handles a plurality of communication bands and ensures isolation between transmission and reception in each of the communication bands is successfully implemented.

Figure 5:
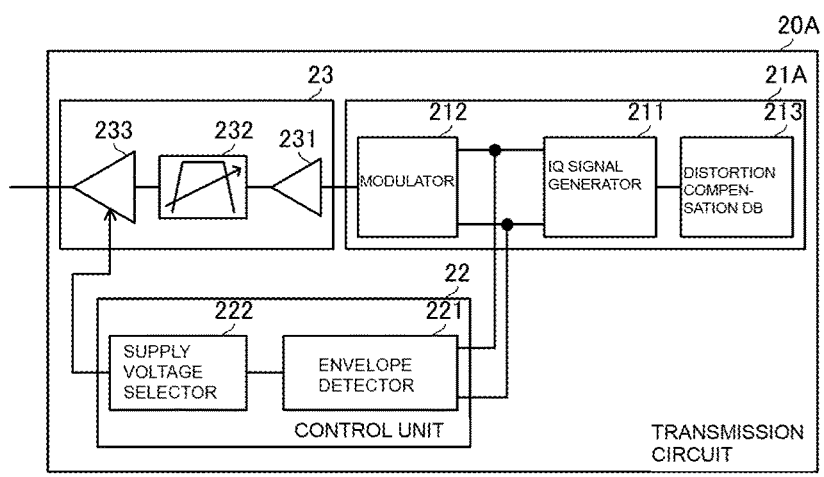
FIG. 5 is a circuit block diagram of a transmission circuit according to a second embodiment of the present disclosure.

The transmission circuit according to a second embodiment of the present disclosure will be described next with reference to the drawings. FIG. 5 is a circuit block diagram of the transmission circuit according to the second embodiment of the present disclosure.

A transmission circuit 20A according to this embodiment includes a transmission signal generation unit 21A having a configuration different from that of the transmission signal generation unit 21 according to the first embodiment. The rest of the configuration is the same as that of the transmission circuit 20 according to the first embodiment.

The transmission signal generation unit 21A includes the IQ signal generator 211, the modulator 212, and a distortion compensation DB 213. The distortion compensation DB 213 stores frequency component compensation data used to compensate for a distortion to be caused by the transmission signal amplification unit 23. The IQ signal generator 211 reads the frequency component compensation data stored on the distortion compensation DB 213 and generates an I-phase signal and a Q-phase signal so that the distortion is compensated for. That is, the transmission signal generation unit 21A performs a digital pre-distortion (DPD) process.

Figure 6:
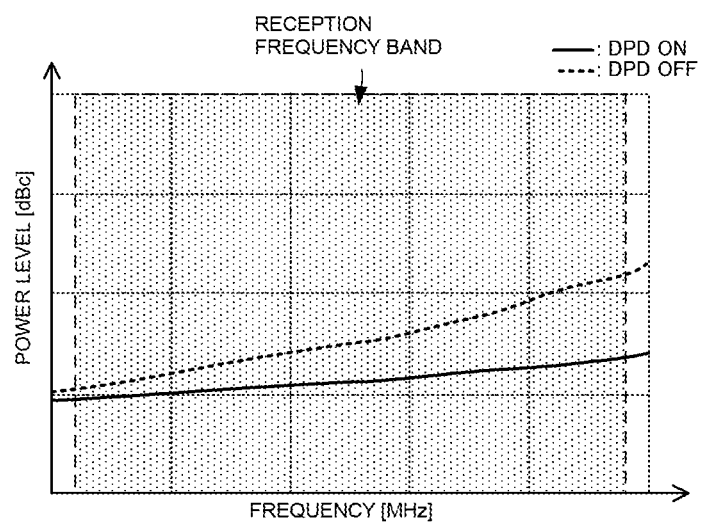
FIG. 6 is a diagram illustrating frequency characteristics of power levels of transmission signals of the transmission circuit according to the second embodiment of the present disclosure and a transmission circuit of the related art.

FIG. 6 is a diagram illustrating frequency characteristics of power levels of transmission signals of the transmission circuit according to the second embodiment of the present disclosure and a transmission circuit of the related art. In FIG. 6, a solid line denotes the case where the DPD process is performed, whereas a dash line denotes the case where the DPD process is not performed. As illustrated in FIG. 6, the reception-signal frequency component contained in the transmission signal is successfully suppressed by performing the DPD process.

Since the envelope-based process described in the first embodiment and the DPD process exert their effects individually, the reception-signal frequency component contained in the transmission signal output from the transmission circuit 20A is successfully suppressed further by using the configuration of the transmission circuit 20A according to this embodiment.

Figure 7:
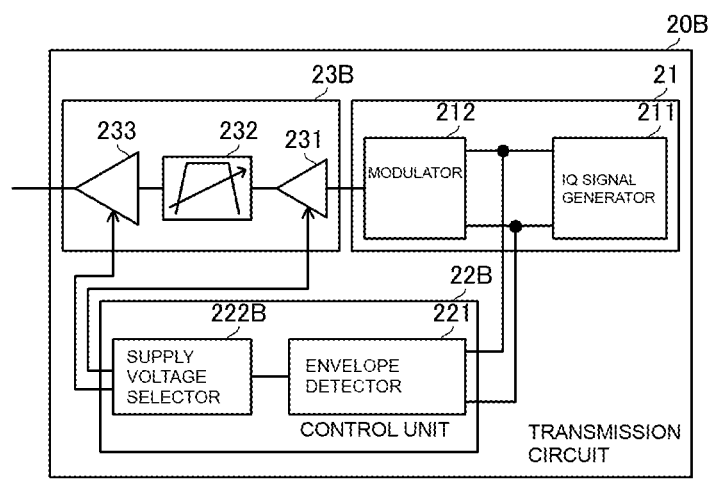
FIG. 7 is a circuit block diagram of a transmission circuit according to a third embodiment of the present disclosure.

A transmission circuit according to a third embodiment of the present embodiment will be described next with reference to the drawing. FIG. 7 is a circuit block diagram of a transmission circuit according to the third embodiment of the present disclosure.

A transmission circuit 20B according to this embodiment includes a control unit 22B and a transmission signal amplification unit 23B having configurations different from those of the control unit 22 and the transmission signal amplification unit 23 according to the first embodiment, respectively. The rest of the configuration is the same as that of the transmission circuit 20 according to the first embodiment.

A supply voltage determiner 222B of the control unit 22B applies supply voltage signals to the respective power amplifiers 231 and 233.

The power amplifiers 231 and 233 of the transmission signal amplification unit 23B amplify the transmission signal in accordance with the respective supply voltage signals applied thereto by the supply voltage determiner 222B.

As described above, if the transmission signal amplification unit 23B includes a plurality of stages of power amplifiers, the supply voltage signal may be applied to each of the stages.

REFERENCE SIGNS LIST

1: high-frequency transmission/reception device
10: high-frequency front-end circuit
20, 20A, 20B, 201, 202, 203: transmission circuit
21, 21A: transmission signal generation unit
22, 22B: amplification control unit
23, 23B: transmission signal amplification unit
30, 301, 302, 303: wave separator
31: circulator
32: transmission-side variable filter
33: reception-side variable filter
40, 401, 402, 403: reception circuit
41: LNA (Low Noise Amplifier)
50: switch circuit
60: antenna matching circuit
211: IQ signal generator
212: modulator
213: distortion compensation DB
221: envelope detector
222, 222B: supply voltage determiner
231, 233: power amplifier
232: variable filter
ANT: antenna

The invention claimed is:

1. A high-frequency front-end circuit comprising:
a transmission circuit that outputs a transmission signal included in a communication band;
a reception circuit that performs predetermined signal processing on a reception signal included in the communication band; and
a wave separator that transfers the transmission signal output from the transmission circuit to an antenna and transfers the reception signal supplied from the antenna to the reception circuit,
the transmission circuit comprising:
a transmission signal generation circuit that generates a modulated transmission signal;
a transmission signal amplification circuit including a power amplifier that amplifies the modulated transmission signal; and
a control circuit that determines a supply voltage signal having an amplitude characteristic of a period identical to that of an envelope of the modulated transmission signal and that supplies the supply voltage signal to the power amplifier,
wherein the control circuit determines a supply timing of the supply voltage signal such that a phase difference between a phase of the envelope of the transmission signal and a phase of the supply voltage signal does not equal zero and suppresses a power level of a reception signal frequency component contained in the transmission signal, wherein the transmission signal amplification circuit includes a plurality of stages of power amplifiers, and wherein the transmission signal amplification circuit includes a filter between a last-stage power amplifier among the plurality of stages of power amplifiers and a preceding-stage power amplifier among the plurality of stages of power amplifiers, the filter having a passband that includes a frequency of the transmission signal but excludes a frequency band of a reception signal corresponding to the transmission signal.

2. The high-frequency front-end circuit according to claim 1, wherein the transmission signal generation circuit performs distortion-compensating frequency component control during generation of the transmission signal.

3. The high-frequency front-end circuit according to claim 1, wherein the transmission signal generation circuit includes a distortion compensation database that stores frequency component compensation data for performing the distortion-compensating frequency component control.

4. The high-frequency front-end circuit according to claim 1, wherein the control circuit determines an output timing of the supply voltage signal such that a phase difference between a phase of the supply voltage signal for at least one power amplifier among the plurality of stages of power amplifiers and a phase of an envelope of the transmission signal does not equal zero.

5. The high-frequency front-end circuit according to claim 1, wherein the control circuit determines an output timing of the supply voltage signal such that a phase difference between a phase of the supply voltage signal for the last-stage power amplifier and a phase of the envelope of the transmission signal does not equal zero.

6. The high-frequency front-end circuit according to claim 1, wherein the control circuit determines supply voltage signals for at least two of the power amplifiers of the plurality of stages of power amplifiers and supplies the supply voltage signals to the at least two power amplifiers.

7. The high-frequency front-end circuit according to claim 5, wherein a predetermined frequency band of the reception signal and a predetermined frequency band of the transmission signal are within 20 MHz.

8. The high-frequency front-end circuit according to claim 1, wherein the wave separator includes:

a circulator including a first terminal connected to the transmission circuit, a second terminal connected to the reception circuit, and a third terminal connected to a circuit on the antenna side, a transmission-side variable filter connected between the circulator and the transmission circuit, the transmission-side variable filter having a passband including a predetermined frequency of the transmission signal, and a reception-side variable filter connected between the circulator and the reception circuit, the reception-side variable filter having a passband including a predetermined frequency of the reception signal.

9. A high-frequency front-end transmission and reception control method comprising:

generating a transmission signal included in a communication band;

transferring the generated transmission signal to an antenna;

receiving a reception signal included in the communication band from the antenna;

performing predetermined signal processing on the reception signal, wherein the generating the transmission signal includes:

generating a modulated transmission signal;

amplifying the modulated transmission signal by using a power amplifier;

determining a supply voltage signal having an amplitude characteristic of a period identical to that of an envelope of the transmission signal, such that a phase difference between a phase of the envelope of the modulated transmission signal and a phase of the supply voltage signal does not equal zero and suppresses a power level of a reception signal frequency component contained in the transmission signal; and supplying the supply voltage signal to the power amplifier based on the phase difference, wherein the amplifying of the modulated transmission signal is performed by a plurality of stages of power amplifiers and a filter between a last-stage power amplifier among the plurality of stages of power amplifiers and a preceding-stage power amplifier among the plurality of stages of power amplifiers, the filter having a passband that includes a frequency of the transmission signal but excludes a frequency band of a reception signal corresponding to the transmission signal.

* * * * *